US006982890B2

(12) United States Patent
Venkataramanan

(10) Patent No.: US 6,982,890 B2
(45) Date of Patent: Jan. 3, 2006

(54) THREE PHASE ISOLATED VECTOR SWITCHING AC TO AC FREQUENCY CONVERTERS

(75) Inventor: Venkata Giri Venkataramanan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 85 days.

(21) Appl. No.: 10/682,368

(22) Filed: Oct. 9, 2003

(65) Prior Publication Data

US 2005/0078497 A1 Apr. 14, 2005

(51) Int. Cl.
*H02M 5/16* (2006.01)

(52) U.S. Cl. ...................................................... 363/171

(58) Field of Classification Search ................ 363/164, 363/165, 171, 172

See application file for complete search history.

(56) References Cited

U.S. PATENT DOCUMENTS 2,517,396 A * 8/1950 Logan ........................ 363/172
3,902,112 A * 8/1975 Cordier ...................... 363/160
3,913,005 A * 10/1975 Cook ......................... 363/171
4,628,425 A 12/1986 Venturini et al. ............. 363/10

OTHER PUBLICATIONS

M. Venturini, A. Alesina, "The Generalized Transformer: A New Bidirectional Sinusoidal Waveform Frequency Converter with Continuously Adjustable Input Power Factor," IEEE Power Electronics Specialists Conference Record 1980, Atlanta, GA, Jun., 1980, pp. 242-252.

A. Alesina, M. Venturini, "Intrinsic Amplitude Limits and Optimum Design of Nine-Switches Direct PWM AC-AC Converters," IEEE Power Electronics Specialists Conference Record 1988, Kyoto, Japan, Apr., 1988, pp. 1284-1291.

L. Wei, et al., "Matrix Converter Topologies with Reduced Number of Switches," Proceedings of IEEE Power Electronics Specialists Conference, PESC '02, Jun. 23-27, 2002, pp. 57-63.

* cited by examiner

*Primary Examiner*—Jeffrey Sterrett
(74) *Attorney, Agent, or Firm*—Foley & Lardner LLP

(57) ABSTRACT

A three-phase AC to AC frequency converter has a transformer with a three-phase input and n sets of three-phase secondary outputs, where n is three or more, the voltages at each set of secondary output terminals being one or more multiples of 360°/n out of phase with the voltages at the other sets of secondary output terminals. The sets of secondary output terminals are connected to three single pole, n throw switches, the poles of which are connected to the three output terminals of the frequency converter. Each switch may have n semiconductor switching devices, each connected to the common pole and separately connected to one of the output terminals in each of the sets of secondary output terminals. The three switches are controlled to switch to provide the three-phase voltage from one of the four sets of secondary output terminals at a time to the output terminals of the frequency converter, with the frequency and duty ratio of the switching selected to provide a desired output frequency at the output terminals.

13 Claims, 11 Drawing Sheets

THREE PHASE ISOLATED VECTOR SWITCHING AC TO AC FREQUENCY CONVERTERS

REFERENCE TO GOVERNMENT RIGHTS

This invention was made with United States government support awarded by the following agency: NAVY/ONR N0014-01-1-0623. The United States government has certain rights in this invention.

FIELD OF THE INVENTION

The present invention relates generally to the field of electrical power conversion and particularly to variable input and/or output frequency AC to AC power converters.

BACKGROUND OF THE INVENTION

Many power conversion applications require the conversion of AC power at one frequency to AC power at a higher or lower frequency. One common utilization for such power converters is the variable speed control of AC motors. The most common commercial AC to AC static switch frequency converters utilize an intermediate DC stage. One type of commercial converter, illustrated schematically in FIG. 1, utilizes a rectification stage 20 that provides DC current through an inductor 21 to an inverter stage 22 composed a multiple static switches 23, which are illustrated in FIG. 2. A second type of AC-AC-converter, illustrated schematically in FIG. 3, has a rectification stage 28 that provides DC voltage on DC bus lines 29 and 30 to an inverter stage 32 composed of static switches 33, as illustrated, for example, in FIG. 4. An energy storage capacitor 34 is connected across the DC bus lines 29 and 30. While the DC link configuration of FIG. 3 is widely used in commercial power converters, the DC link capacitor 34 constitutes one life-limiting component in these types of converters, as well as contributing to the bulk and cost of the converter. As an alternative to power conversion systems having an intermediate DC link, a variety of direct AC to AC converters have been developed. An example of a prior AC to AC converter is the matrix converter, shown schematically in FIG. 5, which utilizes one pole, three throw switches 36 to directly convert an AC input voltage at one frequency to an AC output voltage at another frequency. Matrix converters require bidirectional high power semiconductor switches, which are not presently commercially available as single units, but which can be implemented utilizing back to back IGBTs (insulated gate bipolar transistors) 37 and diodes as shown in FIG. 6. Because of the relatively high currents and voltages which these switches must handle, the semiconductor switches required are relatively expensive and can limit the reliability of the converter system.

SUMMARY OF THE INVENTION

In accordance with the present invention, an AC to AC frequency converter system includes a three-phase isolation transformer having three-phase input terminals and multiple sets of three-phase output terminals. The transformer provides multiple sets of three-phase output voltages at secondary output terminals. The transformer may be constructed to provide three or more sets of output voltages at the secondary output terminals, with four sets being preferred. Where four sets of output terminals are utilized, the three-phase voltages at each set of secondary output terminals are one or more multiples of 90° out of phase with the voltages on the other sets of output terminals. More generally, where the number of sets of output terminals is n, the three-phase voltages at each set of output terminals are one or more multiples of 360°/n out of phase with the voltages on the other sets. In addition to providing electrical isolation, the transformer may also be selected to step up, step down, or retain the magnitude of the input voltage. One of the phase voltages of each of the n secondary output terminals is applied to a first single pole, n throw switch, a second phase voltage of each of the secondary output terminals is provided to a second single pole, n throw switch, and a third of the output phase voltages from each of the sets of output terminals is applied to a third single pole, n throw switch. The three switches are controlled to switch together so that in each position of the switches the three-phase voltages from one of the sets of the secondary output terminals are connected to the poles of the three switches that in turn are connected to three output terminals of the converter. These three switches may then be switched at a desired frequency and duty cycle to obtain an output voltage at the output terminals of the converter that is at a selected frequency.

The multiple sets of three-phase voltages at the sets of secondary output terminals of the transformer form a complete basis set of functions from which any set of three-phase output voltages at any arbitrary frequency and phase angle may be derived by appropriate choice of duty ratio functions.

Because the converter of the invention includes a transformer, it is ideally suited for applications where transformer isolation and voltage step up or step down are required, and it provides bidirectional power flow and sinusoidal input and output waveforms. In contrast to conventional DC link conversion systems, a DC link energy storage capacitor is not required, eliminating one of the reliability problem areas of conventional converters, and additional semiconductor switches are not required in contrast to the matrix converter.

Further objects, features and advantages of the invention will be apparent from the following detailed description when taken in conjunction with the accompanying drawings.

DETAILED DESCRIPTION OF THE INVENTION

Figure 1:
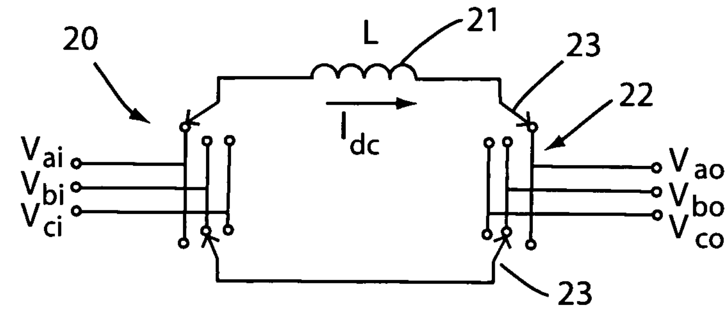
FIG. 1 is a simplified ideal switch equivalent circuit of a prior art three-phase AC to three-phase AC frequency changer with a DC current link.
Figure 2:
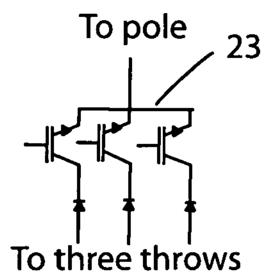
FIG. 2 is an example of a realization of each pole of the switch for the inverter of FIG. 1.
Figure 3:
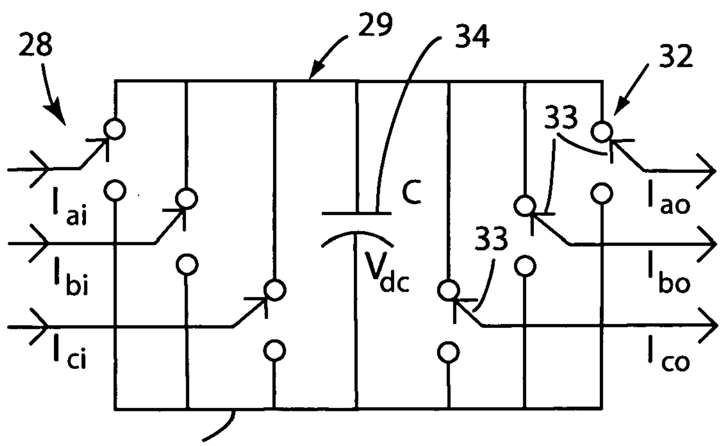
FIG. 3 is a simplified ideal switch equivalent circuit of a three-phase AC to three-phase AC frequency changer with a DC voltage link in accordance with the prior art.
Figure 4:
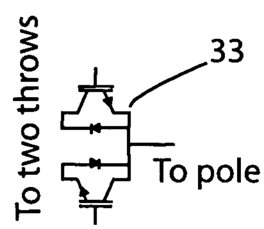
FIG. 4 is an example of a solid-state switch implementation for each pole of the switch of the inverter of FIG. 3.
Figure 5:
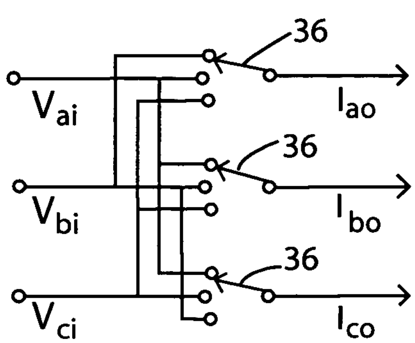
FIG. 5 is an ideal switch equivalent circuit of a three-phase AC to three-phase AC frequency changer with matrix converter topology in accordance with the prior art.
Figure 6:
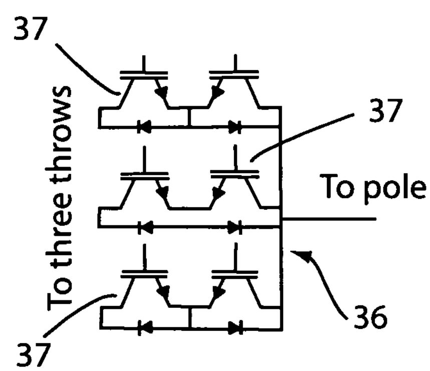
FIG. 6 shows a solid state switch realization of each pole of the switch of the matrix converter of FIG. 5.
Figure 7:
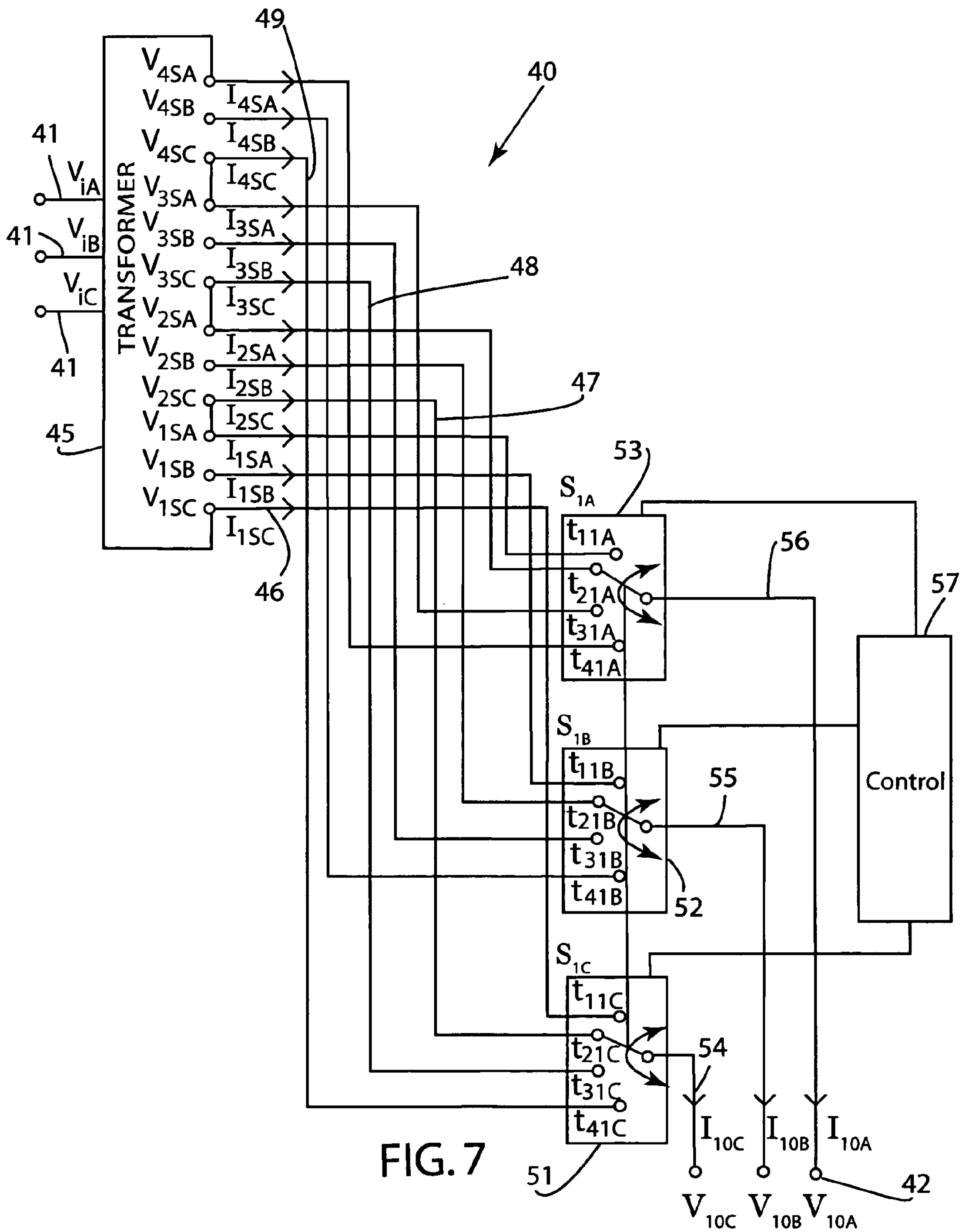
FIG. 7 is an ideal switch equivalent circuit schematic of a three-phase AC to three-phase AC frequency converter in accordance with the invention.

For purposes of illustrating the invention, a frequency converter in accordance with the present invention having four sets of transformer secondaries is shown generally at 40 in schematic form in FIG. 7. It is understood that the present invention may be implemented with a transformer having n sets of secondary terminals having voltages which are multiples of 360°/n out of phase, where n is three or more. The converter 40 receives three-phase input power at input terminals 41, with phase voltages $V_{iA}$, $V_{iB}$, $V_{iC}$, and provides output power at output terminals 42, with phase voltages $V_{10A}$, $V_{10B}$, $V_{10C}$ and output currents $I_{10A}$, $I_{10B}$, $I_{10C}$. In accordance with the invention, the frequency of the output voltages and currents at the output terminals 42 may be selected to be different from (either higher or lower than) the frequency of the voltage applied to the input terminals 41. In addition, the magnitude of the output voltages $V_{10A}$, $V_{10B}$, $V_{10C}$, may, if desired, also be higher or lower than the magnitude of the input voltages $V_{iA}$, $V_{iB}$, $V_{iC}$.

Figure 8:
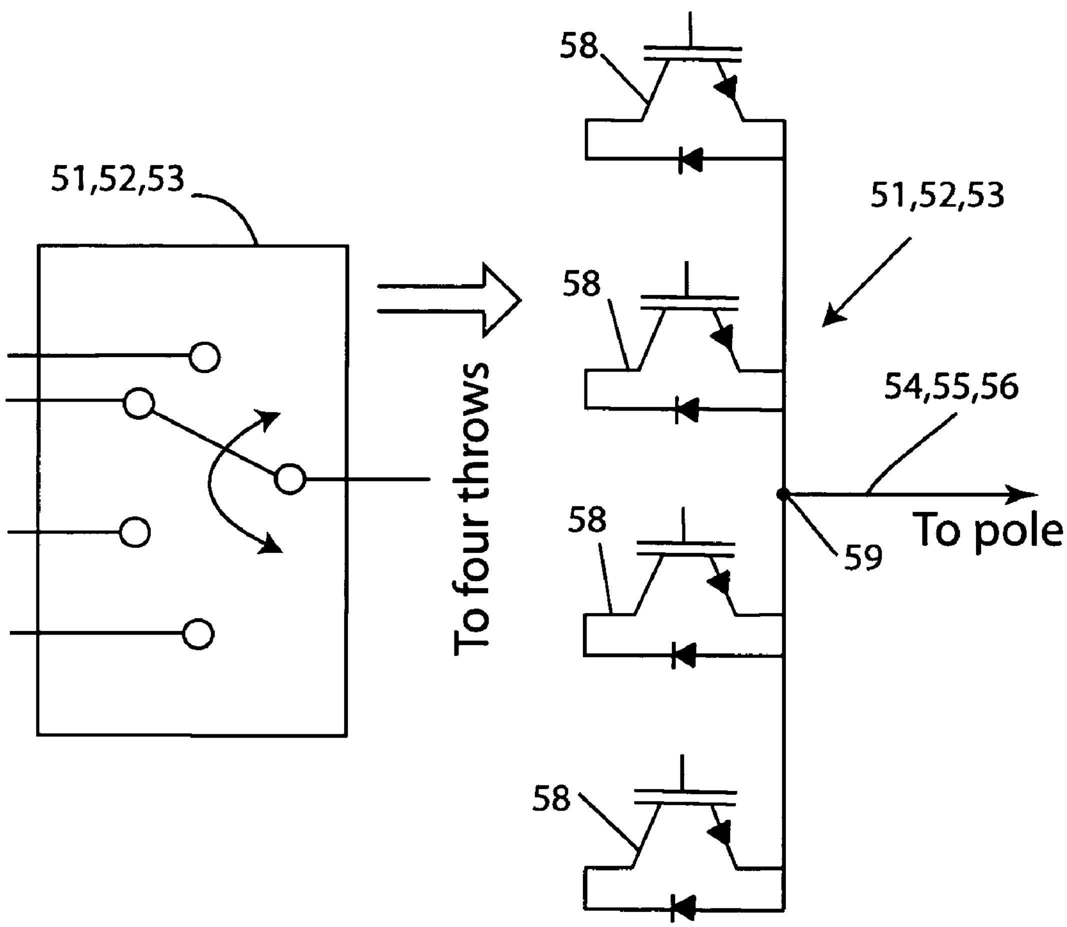
FIG. 8 is an example of a solid-state switch realization of the switches for the frequency converter of FIG. 7.

The power converter 40 includes a transformer 45 which receives the input voltages at the terminals 41 and provides four sets of three-phase output voltages at sets of secondary output terminals 46, 47, 48 and 49. The three-phase voltages at each of the sets of output terminals 46, 47, 48 and 49 are one or more multiples of 90° out of phase with the voltages on the other sets of output terminals. The transformer 45 provides electrical isolation between the input terminals 41 and the secondary output terminals 46–49, and the transformer 45 may be selected to step-up, step-down, or retain the magnitude of the input voltage on the input terminals 41 at the secondary output terminals 46–49. One of the phase voltages of each of the secondary output terminals 46–49 is applied to a first single pole, four throw switch 51, a second phase voltage of each of the secondary output terminals 46–49 is applied to a second single pole, four throw switch 52, and a third of the output phase voltages from each of the sets of output terminals 46–49 is applied to a third single pole, four throw switch 53. Output lines 54, 55 and 56 from the poles of the switches 51, 52 and 53, respectively, are connected to the output terminals 42. The switching of the switches 51–53 is actuated by control signals provided from a controller 57. Each of the switches 51, 52 and 53 may be realized utilizing four gate controlled switching devices 58 (e.g., IGBTs with anti-parallel connected diodes) which are connected together at a common node 59 that forms the output pole of the switch 51, 52 or 53, and that may be connected to the output line 54, 55 or 56, as illustrated in FIG. 8.

Figure 9:
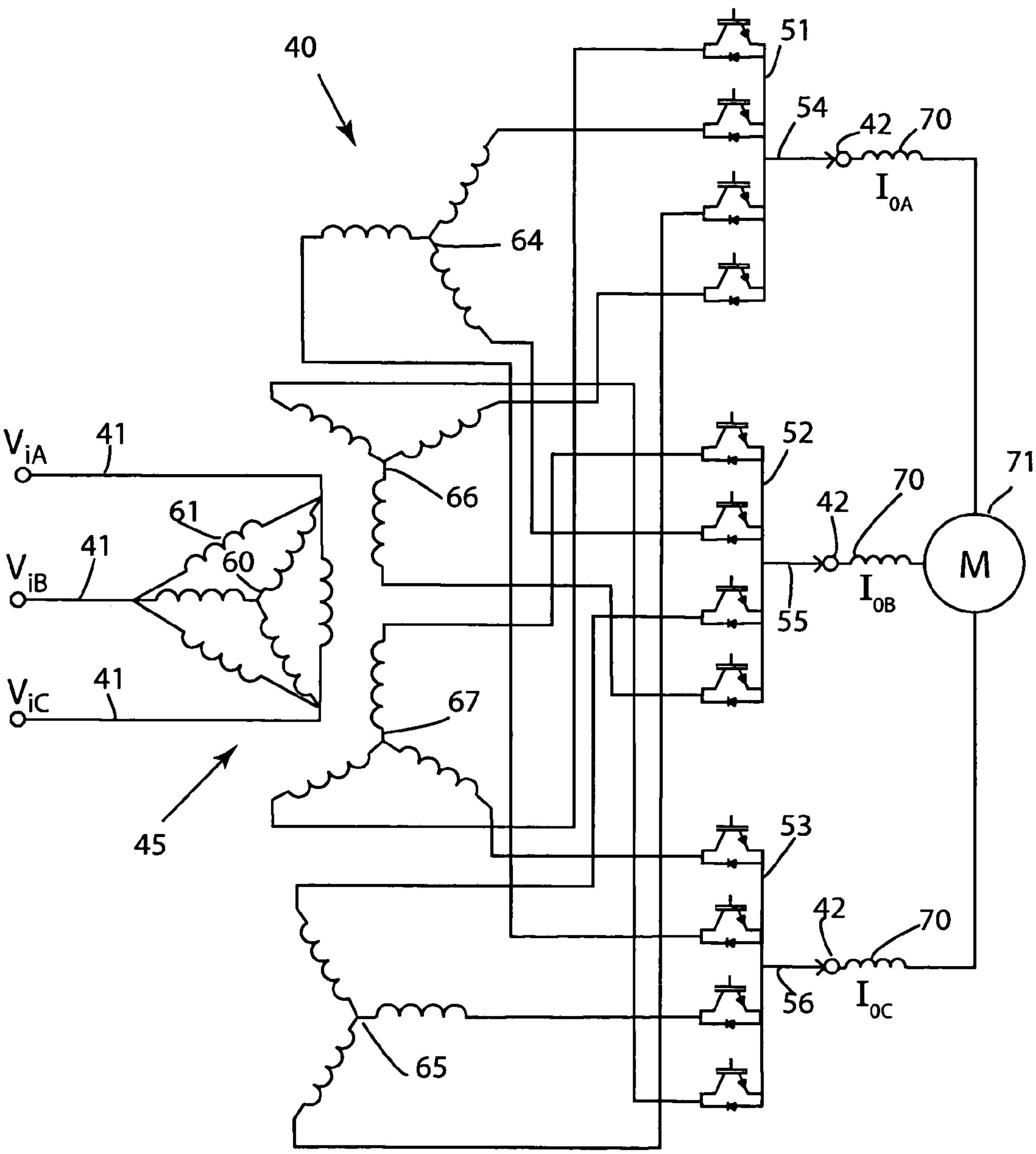
FIG. 9 is a more detailed schematic circuit diagram illustrating the connections of the transformer and the solid state switches for the frequency converter in accordance with the invention.

FIG. 9 illustrates an example of an implementation of the frequency converter 40 utilizing a transformer 45 having a star connected primary 60, a parallel, delta connected primary 61, and four star connected secondaries 64, 65, 66 and 67. The secondaries 64 and 65 are coupled to the star connected primary 60 and the secondaries 66 and 67 are coupled to the delta connected primary 61. Each of the secondary windings is magnetically coupled to the primary winding to which it is shown parallel in FIG. 9. For purposes of exemplification, in FIG. 9 the output voltages at the output terminals 42 are supplied through smoothing inductors 70 to a three-phase motor 71 to drive the motor at a variable frequency that is determined by the switching of the switches 51–53, as explained further below. A generator may be connected in place of the motor 71 since power can be transferred in either direction (or the motor 71 can function as a generator in a regenerative braking mode). Capacitor-inductor filters may also be connected to the lines leading to the motor 71 to provide further filtering of higher frequency noise from the power provided to the motor, and capacitors or snubber circuits may be connected to the secondary output terminals to reduce transient voltage spikes.

The theory of operation of the frequency converter 40 and the manner in which the switches 51–53 may be controlled to provide a selected output frequency are discussed below.

Let the voltages and currents at the voltage port (input terminals) be defined as $V_{iS}=[V_{iSA}\ V_{iSB}\ V_{iSC}]^T$, and $I_{iS}=[I_{iSA}\ I_{iSB}\ I_{iSC}]^T$, respectively for i=1 . . . 4. Let the voltages and currents at the current port (output terminals) be defined as $V_{10}=[V_{10A}\ V_{10B}\ V_{10C}]^T$, $I_{10}=[I_{10A}\ I_{10B}\ I_{10C}]^T$, respectively. Let $H_{ij}(t)$, the switching function of the throws of the switches, be defined as $$H_{i10}(t)=\begin{cases}1 & \text{if } t_{i10} \text{ is closed}\\ 0 & \text{otherwise}\end{cases} \quad \text{for } i=1,2\ldots4 \tag{1}$$

Note that all the throws of the three poles of the switch are "ganged" together so that they operate in synchronism. The transfer properties of the converter may now be defined as $$V_{10}(t)=\sum_{i=1}^{4} H_{i10}(t)\cdot V_{iS} \tag{2}$$

and $$I_{is}(t)=H_{i10}(t)\cdot I_{10} \tag{3}$$

The average value of the switching functions may be readily represented by the duty ratio of the particular throw using $$m_{i10}(\tau)=\frac{1}{T}\int_{\tau-T}^{\tau}H_{i10}(t)\cdot dt \tag{4}$$

With the definition of the average switching function (or duty ratio of the $i^{th}$ throw), the transfer properties now become, $$V_{10}(t)=\sum_{i=1}^{4}m_{i10}(t)\cdot V_{iS} \tag{5}$$

and $$I_{is}(t)=m_{i10}(t)\cdot I_{10} \tag{6}$$

Figure 10:
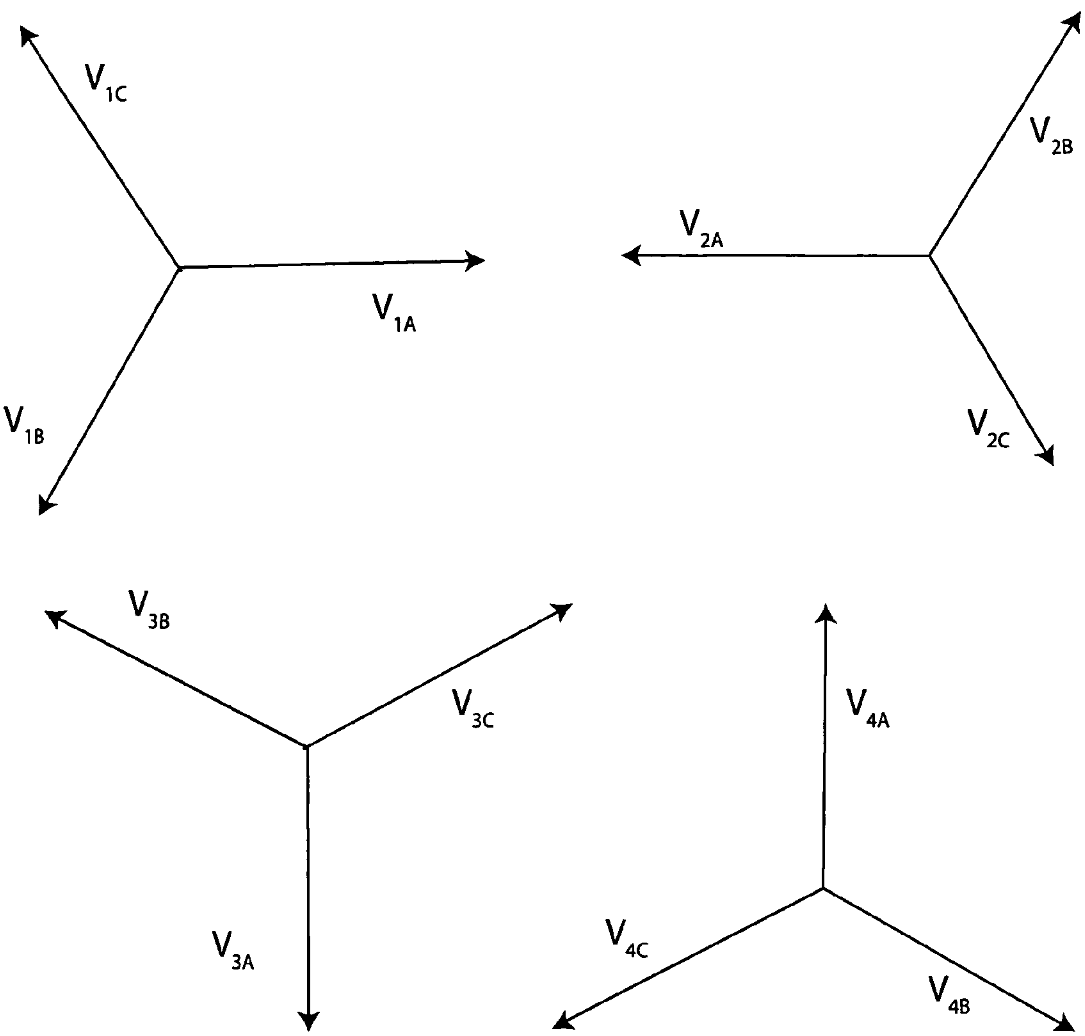
FIG. 10 are phasor representations of three-phase systems of voltages feeding the voltage port of the AC to AC frequency converter in accordance with the invention.
Figure 11:
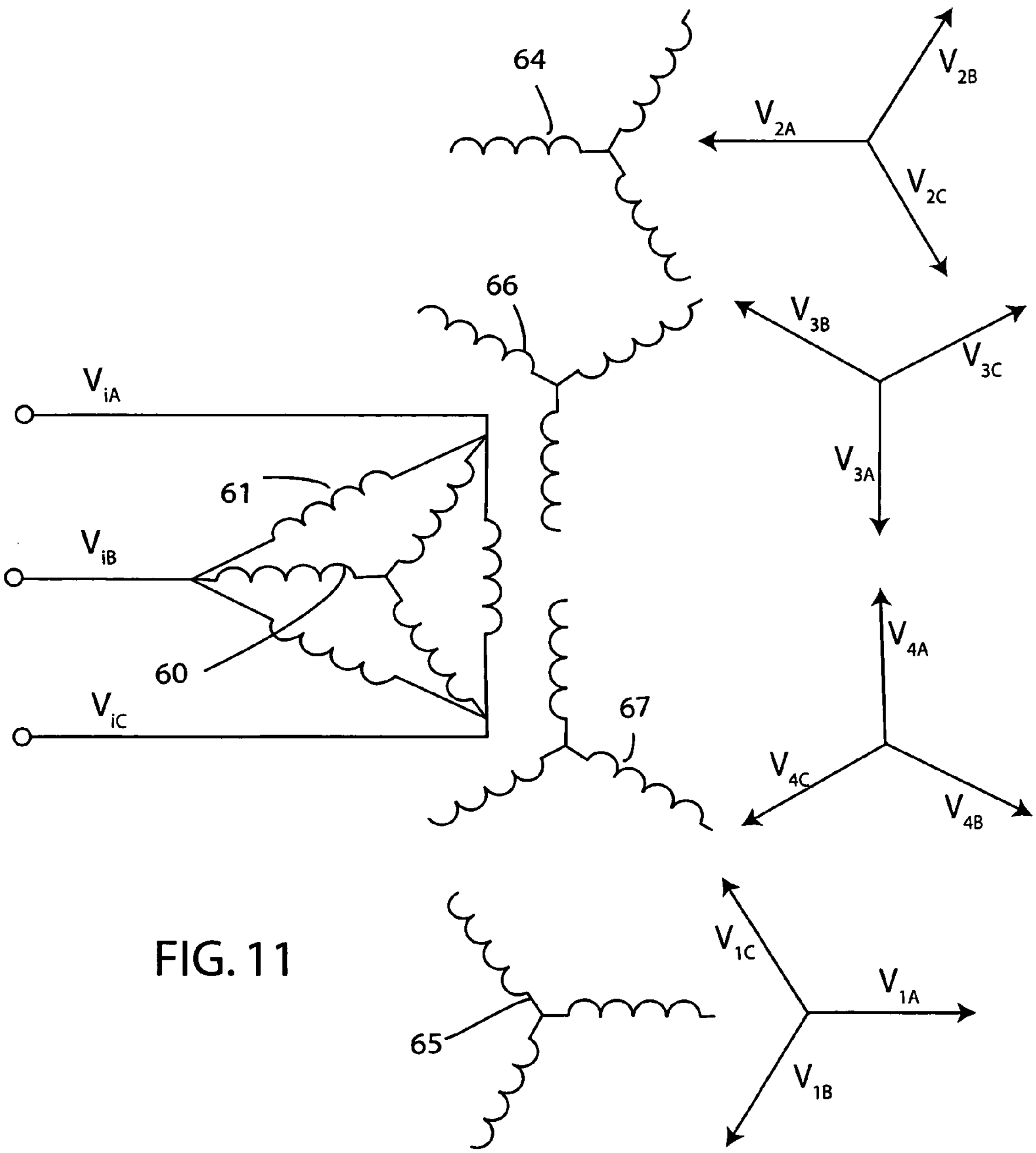
FIG. 11 is a simplified schematic of the circuit of FIG. 9 illustrating the transformer connections and corresponding output voltage phasors to drive the set of orthogonal three-phase systems in accordance with the invention (windings that are parallel to each other in FIG. 11 are coupled together between the primary and secondary).

Let the set of three-phase voltages be chosen as $$V_{1S}=V_m[\cos(\theta)\cos(\theta-2\pi/3)\cos(\theta+2\pi/3)]^T, \tag{7}$$

$$V_{2S}=-V_m[\cos(\theta)\cos(\theta-2\pi/3)\cos(\theta+2\pi/3)]^T, \tag{8}$$

$$V_{3S}=V_m[\sin(\theta)\sin(\theta-2\pi/3)\sin(\theta+2\pi/3)]^T, \tag{9}$$

$$V_{4S}=-V_m[\sin(\theta)\sin(\theta-2\pi/3)\sin(\theta+2\pi/3)]^T, \tag{10}$$

where $V_m$ is the peak value of the input line to neutral voltage and $\theta=2\pi$ Ft, F being the input frequency. FIG. 10 represents the phasors of the four three-phase systems of voltages. These four sets of three-phase voltages form an orthogonal set of functions from which any set of three-phase output voltages may be derived through appropriate choice of duty ratio functions. For instance, let the duty ratio function for the different throws be chosen as $$m_{110}(t)=[1+\cos(\beta+\theta)]/4; m_{210}(t)=m[1-\cos(\beta+\theta)]/4 \tag{10}$$

$$m_{310}(t)=m[1+\sin(\beta+\theta)]/4;\ m_{410}(t)=m[1-\sin(\beta+\theta)]/4; \tag{11}$$

where m is a selected modulation index and $\beta=2\pi F_o t$, with $F_o$ being the desired output frequency. With this choice of duty ratio functions the output voltages become, $$V_{10}=mV_m[\cos(\beta)\cos(\beta-2\pi/3)\cos(\beta+2\pi/3)]^T$$

thus realizing the frequency conversion function. In order to derive the orthogonal set of three-phase voltages, the transformer 45, comprised of four three-phase transformers, may be used, as illustrated in FIG. 11 in simplified form. Duty ratio functions other than those set forth in equations (10) and (11) may also be utilized.

Figure 12:
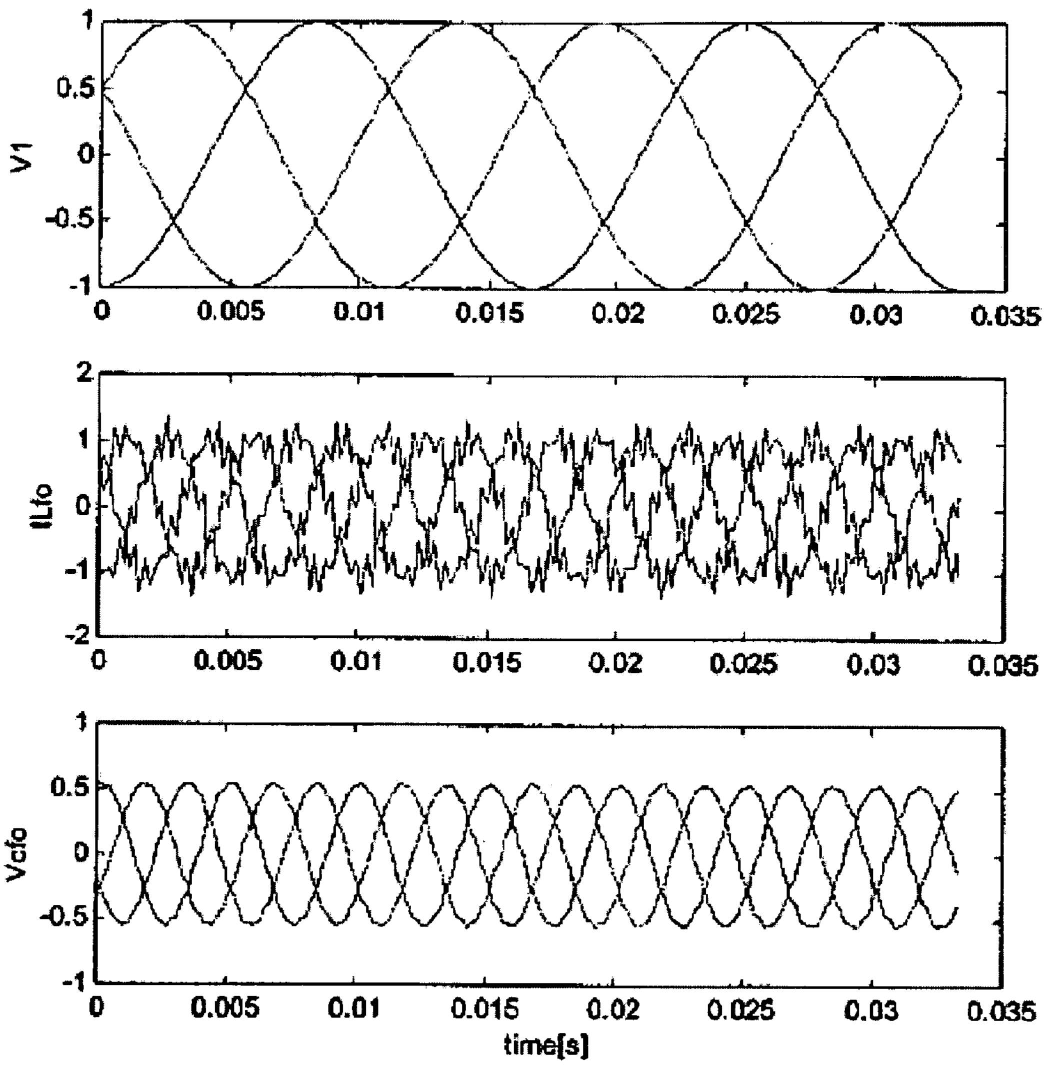
FIG. 12 are waveforms obtained from a simulation of the AC to AC frequency converter of the invention using vector switching with a 60 Hz input and a 200 Hz output.
Figure 13:
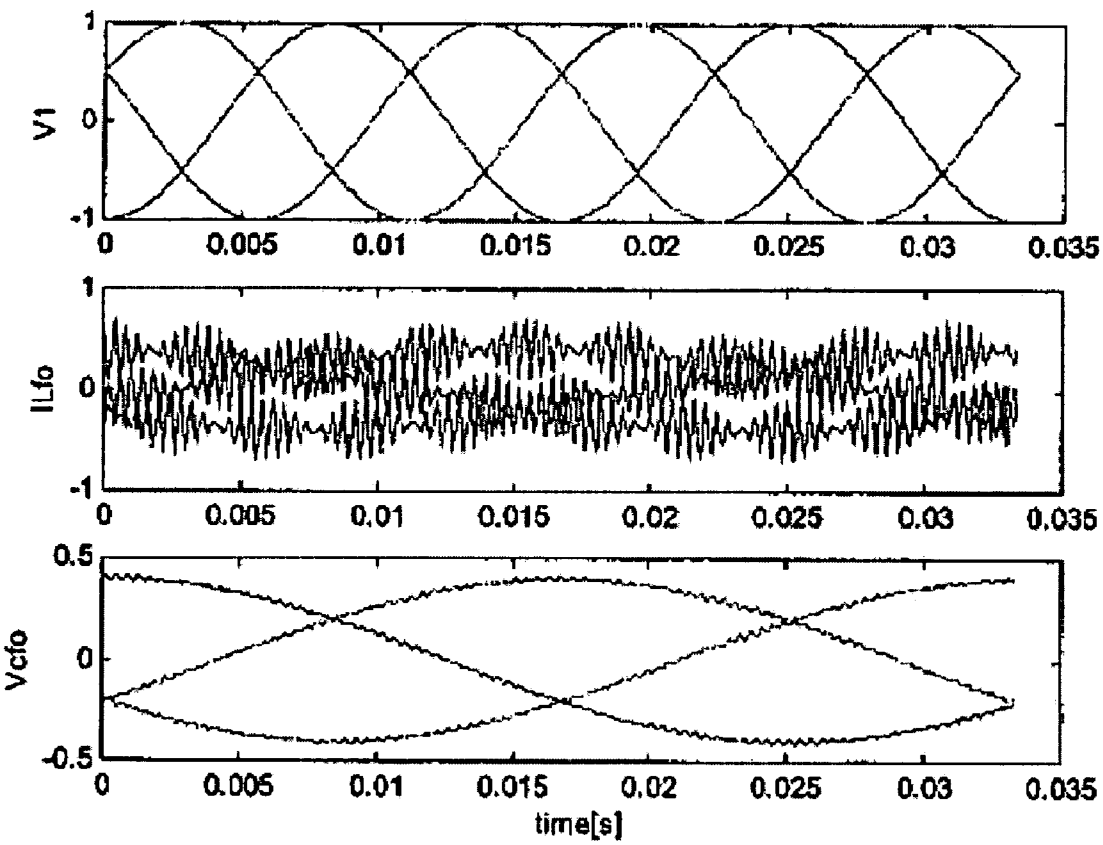
FIG. 13 are waveforms obtained from a simulation of the AC to AC frequency converter of the invention using vector switching with a 60 Hz input and a 20 Hz output.

Detailed computer simulation of the converter operation and modulation algorithm in accordance with the invention was carried out and the results are illustrated in FIG. 12. The simulation model included a three-phase L-C output filter that is not illustrated in FIG. 9. The waveforms shown in FIG. 12 are the three-phase input voltages (top), output currents (middle), and output voltages (bottom). The operating conditions are input voltage at 60 Hz, and output voltage at 200 Hz. FIG. 13 shows corresponding waveforms when the frequency is changed from 60 Hz input to 20 Hz output.

Figure 14:
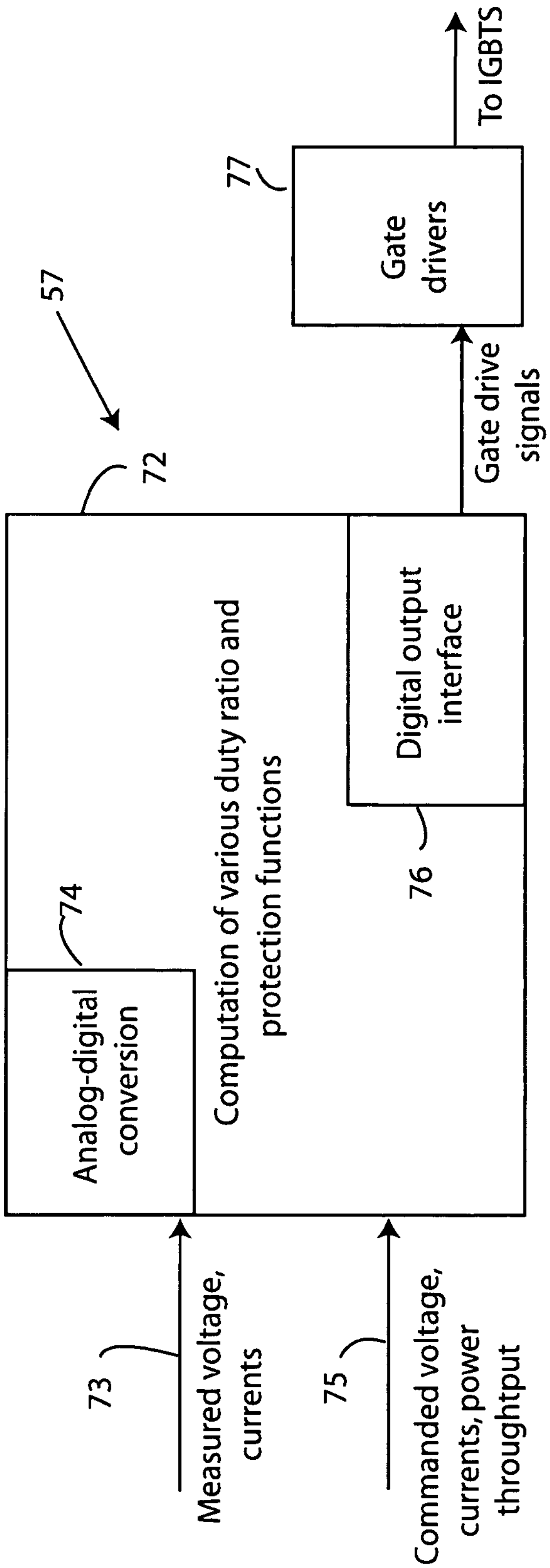
FIG. 14 is a block diagram of a controller for the frequency converter of the invention.

A block diagram of the controller 57 that may be utilized to carry out control of the switches of the converter is shown in FIG. 14. The controller 57 illustratively includes a digital controller 72 such as a digital signal processor (DSP) of conventional implementation for control of AC machine drives, e.g., Texas Instruments TMS 320F240 and Motorola 56F801. The digital controller 72 receives signals corresponding to measured input voltages $V_{iA}$, $V_{iB}$, $V_{iC}$ (from the input terminals 41) and output currents $I_{OA}$, $I_{OB}$, $I_{OC}$ (at the output terminals 42) on lines 73, which signals are converted to digital data by an analog to digital converter 74. Command values for voltage, currents, and power throughput are received from a user interface 75. The digital controller 57 performs duty ratio calculations as discussed above and protection functions, and provides output signals through a digital output interface 76 to gate drivers 77 that provide the gate drive signals to the switches (e.g., IGBTs) of the converter.

Figure 15:
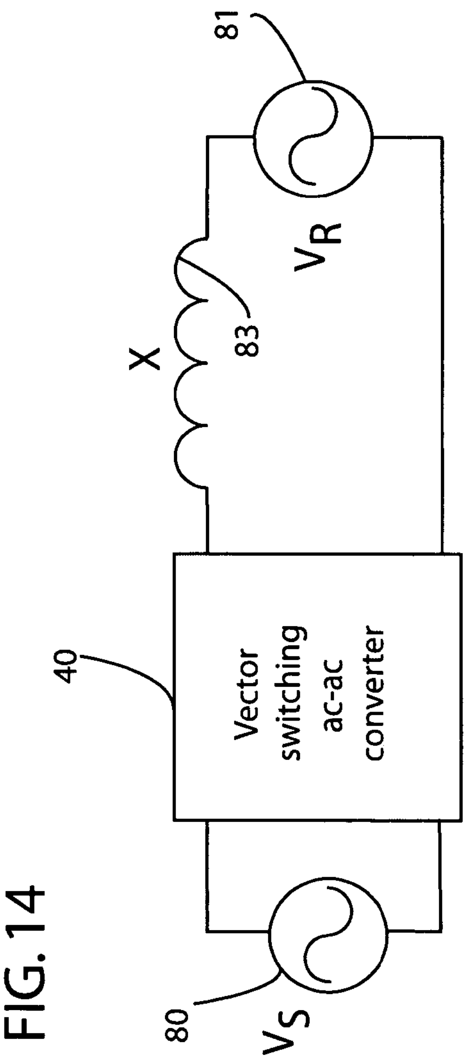
FIG. 15 is a simplified single phase equivalent circuit schematic diagram illustrating bidirectional power flow in the converter of the invention.

The converter of the invention can also carry out control of power flow without changing frequency. This may be illustrated with respect to the diagram of FIG. 15, a single-phase equivalent circuit of the three-phase system, in which the converter 40 interconnects a sending voltage source 80 of voltage $V_S$ and a receiving voltage source 81 of voltage $V_R$, with a line reactance 83 having a reactance value X. In this case, if the duty ratio of the various throws are as described above, the complex representation of the power received may be expressed as:

$$S=\frac{[(m_{110}-m_{210})+j(m_{410}-m_{310})]V_S-V_R}{jX}\ V_R^* \tag{12}$$

where the voltages are represented as complex phasors and * represents the complex conjugate phasor.

If the vector switching converter 40 was not present in the system the power received is:

$$S=\frac{V_S-V_R}{jX}\ V_R^*$$

From equations (12) and (13), it may be noted that by suitably modifying the duty ratio variables, the real and reactive power transferred through the line may be controlled appropriately. In some cases, it may be desirable to operate the switching power converter 40 in conjunction with conventional power flow control devices such as mechanical or thyristorized tap changing transformers and boosters in order to improve the controllability at an economical cost.

Figure 16:
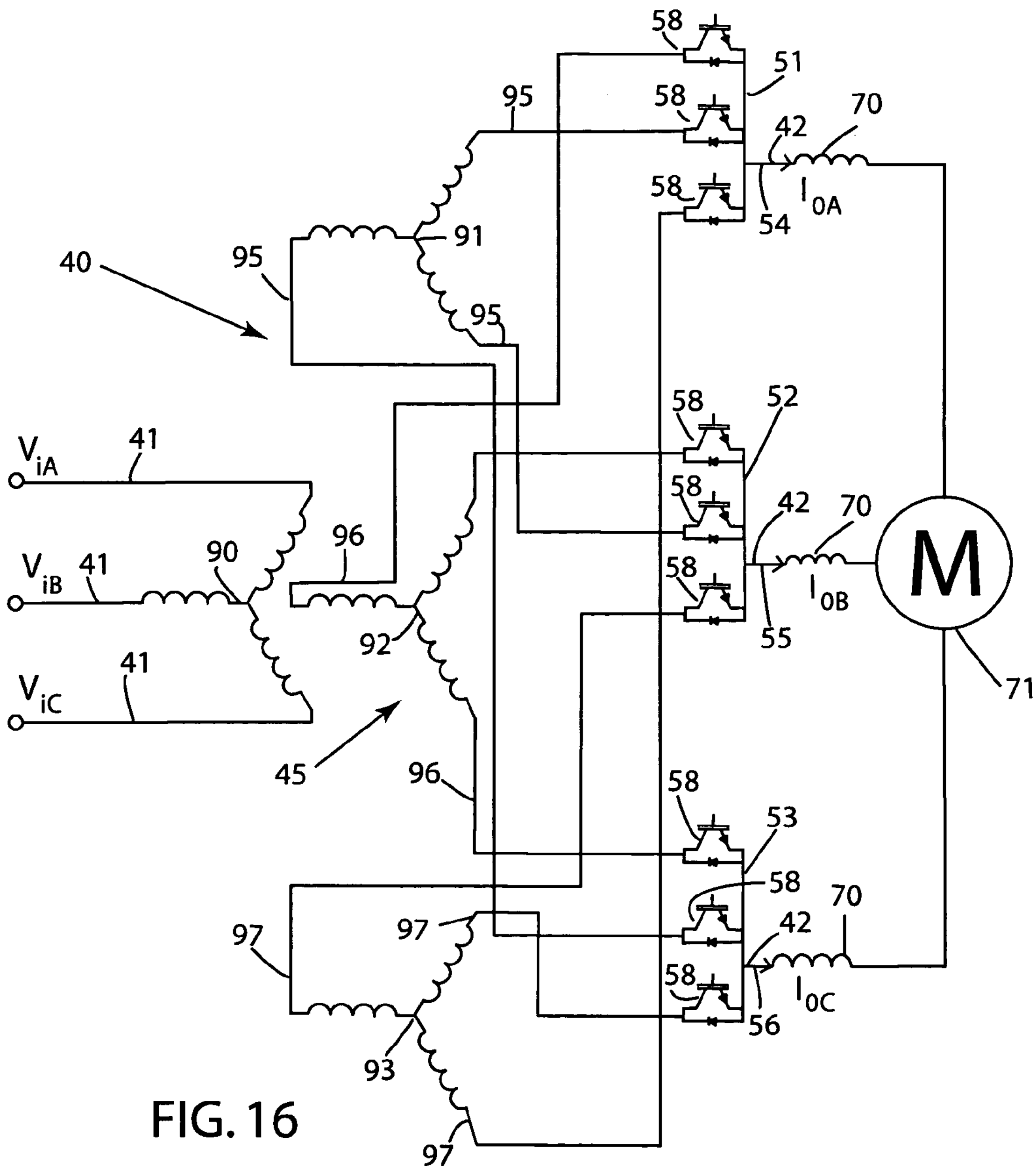
FIG. 16 is a circuit diagram illustrating the connections of the transformer and the solid-state switches for a frequency converter in accordance with the invention having a transformer with three sets of three-phase secondaries.
Figure 18:
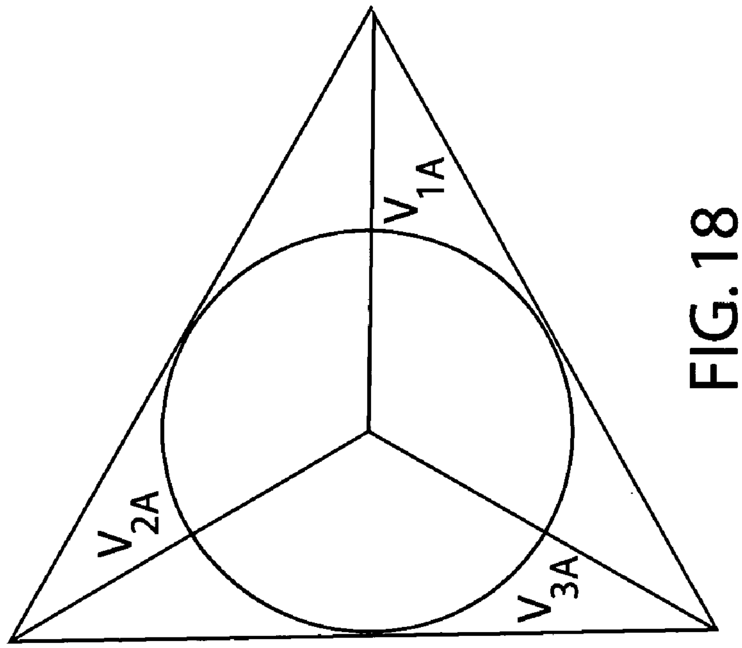
FIG. 18 is a phasor diagram of the secondary voltages for one phase for the converter of FIG. 16.
Figure 17:
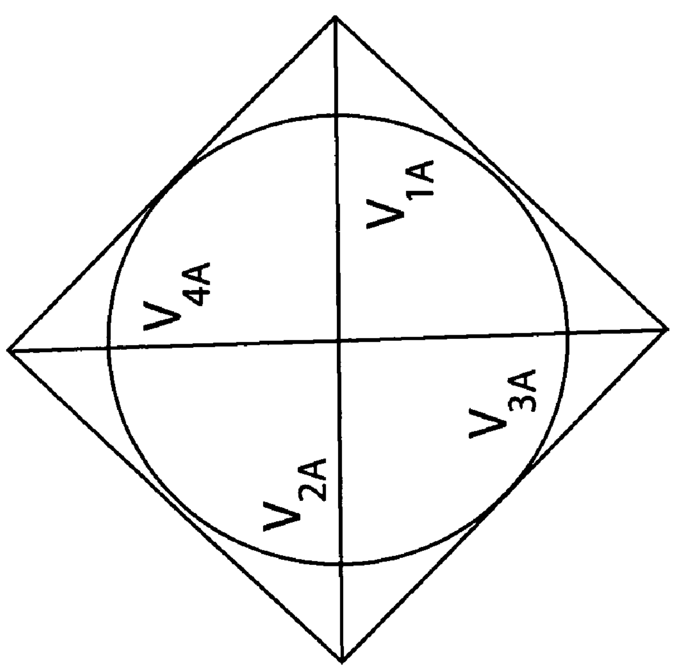
FIG. 17 is a phasor diagram of the secondary voltages for one phase for the converter of FIG. 9.

As discussed above, the present invention may be implemented with a transformer having three or more sets of secondary terminals. FIG. 16 is a circuit diagram of an implementation of the invention with a transformer having a star connected three-phase primary 90 and three star connected three-phase secondaries 91–93 which are connected to three sets of output terminals 95–97, with each of the switching devices 58 within each of the switches 51–53 being connected to one of the secondary output terminals. Each of the secondary windings is magnetically coupled to the primary winding to which it is shown parallel in FIG. 16. The implementation of FIG. 16 requires one less secondary and one less switching device 58 in each of the switches 51–53 than the implementation of FIG. 9, but with a corresponding reduction in realizable output voltage magnitude. For a converter of the invention having "n" sets of secondary windings, the largest amplitude of any phase of the balanced three-phase output voltages is limited by the radius of the largest circle that can be drawn inside the polygon formed by the phasors of the secondary voltages $V_{1A}, V_{2A}, \ldots V_{nA}, V_{1B}, V_{2B}, \ldots V_{nB}$, and $V_{1C}, V_{2C}, \ldots V_{nC}$. The circle and polygon formed by the phasors is shown in FIG. 17 for four sets of secondary windings and is shown in FIG. 18 for three sets of secondary windings. These figures illustrate the reduction in available output voltage that occurs with a reduction in secondary terminals. If desired, the secondary windings can be wound with a larger number of turns to compensate for the reduction in voltage. Appropriate tradeoffs in the design of the converter can be made to fulfill design objectives for a specific application.

The number of converter semiconductor switching devices (e.g., IGBTs) utilized in the converter of the invention compares favorably with matrix converters (12 for a converter having four secondaries rather than 18 required for a comparable matrix converter) and equally with the DC link converter approaches. Since the converter of the invention utilizes a transformer, it is ideally suitable for applications where transformer isolation and voltage step-down or step-up are required, and is capable of providing bidirectional power flow and sinusoidal input and output waveforms.

It is understood that the invention is not confined to the particular embodiments set forth herein, but embraces all such forms thereof as come within the scope of the following claims.

What is claimed is:

1. An AC to AC frequency converter comprising:

(a) a transformer having a set of three-phase primary input terminals and n sets of three-phase secondary output terminals, where n is three or more, with the voltages of each set of secondary output terminals being one or more multiples of 360°/n out of phase with the voltages on the other sets of output terminals; and (b) three single pole, n throw switches, the three output poles of the three switches electrically connected to three output terminals of the frequency converter, the n throws of each switch connected to one of the secondary output terminals in each set of secondary output terminals such that the switches can be switched to selectively connect each of the secondary output terminals to the three output poles of the switches.

2. The frequency converter of claim 1 wherein n is equal to four and the transformer includes a star connected primary and a delta connected primary connected in parallel to the input terminals of the transformer, and four star connected secondaries each connected to one of the four sets of secondary output terminals of the transformer, two of the secondaries magnetically coupled to the star connected primary and two of the secondaries magnetically coupled to the delta connected primary.

3. The frequency converter of claim 1 wherein each of the single pole, n throw switches comprises n semi-conductor switching devices each connected to a common pole forming the output pole of the switch and each individually connected to one of the secondary output terminals of the transformer.

4. The frequency converter of claim 3 wherein the semiconductor switching devices are IGBTs with anti-parallel connected diodes.

5. The frequency converter of claim 1 including a controller connected to the switches to control switching of the switches at a selected frequency and switching duty ratio to provide an output voltage at the output terminals of a selected frequency.

6. The frequency of converter of claim 5 wherein n is equal to four and the controller controls the switches to switch with duty ratio functions $m_{110}$, $m_{210}$, $m_{310}$ and $m_{410}$ for the four throws of each switch in accordance with:

$$m_{110}(t)=m[1+\cos(\beta+\theta)]/4;\ m_{210}(t)=m[1-\cos(\beta+\theta)]/4;$$

$$m_{310}(t)=m[1+\sin(\beta+\theta)]/4;\ m_{410}(t)=m[1-\sin(\beta+\theta)]/4;$$

where m is a selected modulation index and $\beta=2\pi F_o t$, with $F_o$ being the desired output frequency and t being time.

7. The frequency converter of claim 1 wherein n is equal to three and the transformer includes three secondaries each connected to one of the three sets of output terminals of the transformer.

8. An AC to AC frequency converter comprising:

(a) a transformer having a set of three-phase primary input terminals and four sets of three-phase secondary output terminals, with the voltages of each set of secondary output terminals being one or more multiples of 90° out of phase with the voltages on the other sets of output terminals; and (b) three single pole, four throw switches, the three output poles of the three switches electrically connected to three output terminals of the frequency converter, the four throws of each switch connected to one of the secondary output terminals in each set of secondary output terminals such that the switches can be switched to selectively connect each of the secondary output terminals to the three output poles of the switches.

9. The frequency converter of claim 8 wherein the transformer includes a star connected primary and a delta connected primary connected in parallel to the input terminals of the transformer, and four star connected secondaries each connected to one of the four sets of secondary output terminals of the transformer, two of the secondaries magnetically coupled to the star connected primary and two of the secondaries magnetically coupled to the delta connected primary.

10. The frequency converter of claim 8 wherein each of the single pole, four throw switches comprises four semiconductor switching devices each connected to a common pole forming the output pole of the switch and each individually connected to one of the secondary output terminals of the transformer.

11. The frequency converter of claim 10 wherein the semiconductor switching devices are IGBTs with anti-parallel connected diodes.

12. The frequency converter of claim 8 including a controller connected to the switches to control switching of the switches at a selected frequency and switching duty ratio to provide an output voltage at the output terminals of a selected frequency.

13. The frequency converter of claim 12 wherein the controller controls the switches to switch with duty ratio functions $m_{110}$, $m_{210}$, $m_{310}$ and $m_{410}$ for the four throws of each switch in accordance with:

$$m_{110}(t)=m[1+\cos(\beta+\theta)]/4;\ m_{210}(t)=m[1-\cos(\beta+\theta)]/4;$$

$$m_{310}(t)=m[1+\sin(\beta+\theta)]/4;m_{410}(t)=m[1-\sin(\beta+\theta)]/4;$$

where m is a selected modulation index and $\beta=2\pi F_o t$, with $F_o$ being the desired output frequency and t being time.

* * * * *